US008797352B2

(12) United States Patent
Lefevre et al.

(10) Patent No.: US 8,797,352 B2
(45) Date of Patent: Aug. 5, 2014

(54) METHOD AND DEVICES FOR VISUALISING A DIGITAL MODEL IN A REAL ENVIRONMENT

(75) Inventors: Valentin Lefevre, Puteaux (FR); Jean-Marie Vaidie, Paris (FR)

(73) Assignee: Total Immersion, Suresnes (FR)

(*) Notice: Subject to any disclaimer, the term of this patent is extended or adjusted under 35 U.S.C. 154(b) by 1078 days.

(21) Appl. No.: 12/063,506

(22) PCT Filed: Aug. 9, 2006

(86) PCT No.: PCT/FR2006/001935
§ 371 (c)(1),
(2), (4) Date: Jul. 19, 2010

(87) PCT Pub. No.: WO2007/017598
PCT Pub. Date: Feb. 15, 2007

(65) Prior Publication Data
US 2010/0277468 A1 Nov. 4, 2010

(30) Foreign Application Priority Data

Aug. 9, 2005 (FR) ..................................... 05 52473
Aug. 9, 2005 (FR) ..................................... 05 52478

(51) Int. Cl.
*G09G 5/00* (2006.01)
(52) U.S. Cl.
USPC ............ 345/632; 345/633; 345/629; 345/419
(58) Field of Classification Search
USPC ............... 345/419, 629, 632, 633, 426, 32
See application file for complete search history.

(56) References Cited

U.S. PATENT DOCUMENTS

| | | | | |
|---|---|---|---|---|
| 7,589,747 | B2* | 9/2009 | Matsui et al. | 345/633 |
| 2002/0094189 | A1 | 7/2002 | Navab et al. | |
| 2002/0105480 | A1* | 8/2002 | Lowry et al. | 345/6 |
| 2002/0149581 | A1* | 10/2002 | Furlong et al. | 345/419 |
| 2004/0135744 | A1* | 7/2004 | Bimber et al. | 345/32 |
| 2005/0231532 | A1* | 10/2005 | Suzuki et al. | 345/633 |
| 2005/0234333 | A1* | 10/2005 | Takemoto et al. | 600/426 |
| 2006/0044327 | A1* | 3/2006 | Okuno et al. | 345/626 |
| 2008/0263460 | A1* | 10/2008 | Altberg et al. | 715/757 |
| 2009/0157478 | A1* | 6/2009 | Yang et al. | 705/10 |
| 2010/0060632 | A1* | 3/2010 | Lefevre et al. | 345/419 |
| 2010/0194863 | A1* | 8/2010 | Lopes et al. | 348/50 |

OTHER PUBLICATIONS

Steinicke, Frank et al., "Virtual Reflections and Virtual Shadows in Mixed Reality Environments", p. 1-4, 2005.*

(Continued)

*Primary Examiner* — Chante Harrison
(74) *Attorney, Agent, or Firm* — Blue Capital Law Firm, P.C.

(57) ABSTRACT

The invention relates to a method and devices for enabling a user to visualize a virtual model in a real environment. According to the invention, a 2D representation of a 3D virtual object is inserted, in real-time, into the video flows of a camera aimed at a real environment in order to form an enriched video flow. A plurality of cameras generating a plurality of video flows can be simultaneously used to visualize the virtual object in the real environment according to different angles of view. A particular video flow is used to dynamically generate the effects of the real environment on the virtual model. The virtual model can be, for example, a digital copy or virtual enrichments of a real copy. A virtual 2D object, for example the representation of a real person, can be inserted into the enriched video flow.

14 Claims, 3 Drawing Sheets

(56) References Cited

OTHER PUBLICATIONS

Heidrich, Wolfgang et al., "Relaistic, Hardware-accelerated Shading and Lighting", Max-Planck-Institute for Computer Science, p. 171-178, 1999.*

Timo Ropinski et al., "Virtual Reflections for Augmented Reality Environments", Int. Conference on Artificial Reality and Telexistence (2004) pp. 311-318.*

Erol Gelenbe, et al. "Enabling Simulation with Augmented Reality." MASCOTS 2003, LNCS 2965, pp. 290-310, Springer-Verlag Berlin Heidelberg, 2004.

Andreas Pomi, et al. "Interactive Mixed Reality Rendering in a Distributed Ray Tracing Framework." Compuer Graphics Group, Saarland University.

Vincent Lepetit et al. "Fully Automated and Stable Registration for Augmented Reality Applications." IEEE, The Second IEEE and ACM International Symposium on Mixed and Augmented Reality, Mar. 2003.

Shintaro Ono, et al. "A Photo-Realistic Driving Simulation System for Mixed-Reality Traffic Experiment Space." IEEE, 2005.

Hirofumi Saito, et al. "A Match Moving Technique for Merging CG and Human Video Sequences." IEEE, 2001.

* cited by examiner

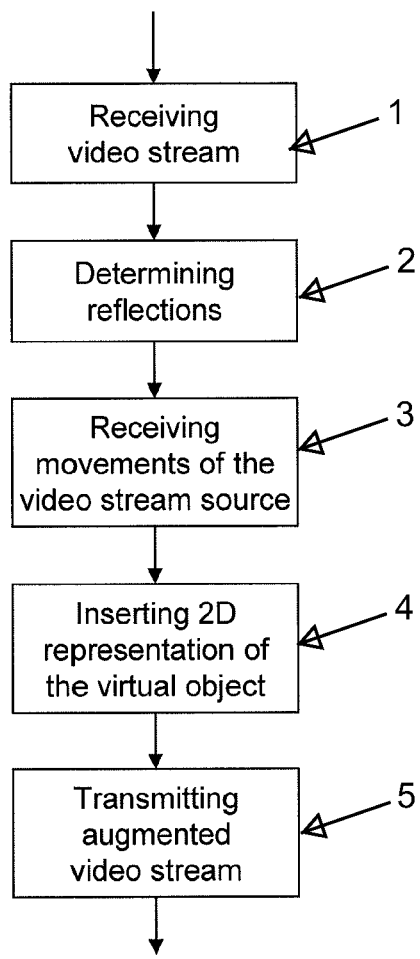

ns of mock-ups of these products has evolved from the real world toward a virtual world. The visualization of a real mock-up requires the fabrication of that mock-up. For reasons of costs and size, the mock-ups are generally produced to a smaller scale than the final product. However, if this mock-up has the advantage of being able to manipulate a real representation of the product and place it in a real environment, the difference of scale makes assessment difficult. Moreover, for each real mock-up, the addition of enhancements is a source of serious and unpredictable delays and costs. For example, a change of headlamp design on a real vehicle mock-up necessitates the production and then the insertion of the headlamp into the real mock-up. At present, in industry, numerous products are first designed and modeled on computer. Before its fabrication the product is virtual and it is possible to visualize it in the form of a digital mock-up. A digital mock-up is a three-dimensional (3D) representation generally comprising the following information: polygons, textures and materials. The use of a digital mock-up offers numerous advantages. In particular, each modification does not impose the production of a new mock-up, reducing design times and costs. The representation of a mock-up is often effected through the use of video projectors and screens forming an immersive room. Although the synthesized image generated to visualize the product is as close to the reality as possible, the product is extracted from its real environment and it is then difficult to compare it with real objects such as competing products or products linked to its environment. There is therefore a need to optimize the visualization of digital models.

METHOD AND DEVICES FOR VISUALISING A DIGITAL MODEL IN A REAL ENVIRONMENT

FIELD

The present invention concerns the visualization of digital models and more particularly a method and devices for visualizing a digital model in a real environment.

BACKGROUND

To limit product development costs and times, the analysis of mock-ups of these products has evolved from the real world toward a virtual world. The visualization of a real mock-up requires the fabrication of that mock-up. For reasons of costs and size, the mock-ups are generally produced to a smaller scale than the final product. However, if this mock-up has the advantage of being able to manipulate a real representation of the product and place it in a real environment, the difference of scale makes assessment difficult. Moreover, for each real mock-up, the addition of enhancements is a source of serious and unpredictable delays and costs. For example, a change of headlamp design on a real vehicle mock-up necessitates the production and then the insertion of the headlamp into the real mock-up. At present, in industry, numerous products are first designed and modeled on computer. Before its fabrication the product is virtual and it is possible to visualize it in the form of a digital mock-up. A digital mock-up is a three-dimensional (3D) representation generally comprising the following information: polygons, textures and materials. The use of a digital mock-up offers numerous advantages. In particular, each modification does not impose the production of a new mock-up, reducing design times and costs. The representation of a mock-up is often effected through the use of video projectors and screens forming an immersive room. Although the synthesized image generated to visualize the product is as close to the reality as possible, the product is extracted from its real environment and it is then difficult to compare it with real objects such as competing products or products linked to its environment. There is therefore a need to optimize the visualization of digital models.

SUMMARY

The invention solves at least one of the problems described hereinabove.

It is an object of the invention to provide a method for visualization in real time of a three-dimensional virtual object in a real environment, that method being characterized in that it comprises the following steps:

reception of at least one video stream;
insertion in real time of a two-dimensional representation of said three-dimensional virtual object into said at least one received video stream and creation of at least one augmented video stream comprising said at least one received video stream into which said two-dimensional representation of said three-dimensional virtual object has been inserted; and
transmission of said at least one augmented video stream.

The visualization of a virtual object in a real environment enables that object to be evaluated in its real environment at the same time as reducing delays and costs. The visualization of a virtual object in a real environment also facilitates analyzing a number of variants of that object.

In one particular embodiment, the method according to the invention comprises a step of reception of a video stream of a second type for dynamically determining the reflections of the real environment on the virtual object. Realism is therefore augmented by the dynamic management of the movements of the real environment on the representation of the virtual object. In particular, the video stream of a second type can modify the environment texture of the virtual object.

Still in accordance with one particular embodiment, the virtual object can be a digital mock-up. The visualization of a digital mock-up in a real environment enables that mock-up to be evaluated in its real environment at the same time as reducing delays and costs. The visualization of a digital mock-up in a real environment also facilitates analyzing a number of variants of that mock-up.

In one particular mode of the invention, the virtual object is a virtual augmentation of a real mock-up present in the real environment. The visualization of virtual augmentations on a real mock-up enables a number of variants of those augmentations to be studied at the same time as reducing delays and costs.

Still in accordance with one particular embodiment, the method according to the invention comprises a step of reception in the augmented video stream of at least one data stream associated with a video stream, that data stream characterizing the movements of the source of the associated video stream, the two-dimensional representation of the three-dimensional virtual object being inserted in real time into the received video stream in accordance with the data stream. In this embodiment, the video cameras are mobile, enabling visualization of the virtual object in a real environment at a viewing angle that can be varied dynamically.

Still in accordance with one particular embodiment, the virtual object is animated to augment its realism and to increase the possibilities of analysis of the object.

According to one particular embodiment, the method according to the invention comprises a step of insertion in real time of a two-dimensional virtual object into the received video stream to compare the analyzed virtual object to another virtual object. In particular, that two-dimensional object can be a representation of a real person.

According to one particular embodiment, the real environment comprises at least one real object, the method according to the invention comprising a step for matching a plurality of feature points of the real object with the corresponding points of a virtual model of that real object to create a spatial link between the real objects and the virtual objects. In particular, the method according to the invention can comprise a step of location of the source of the video stream to determine the viewing angle of the virtual objects. The method according to the invention can also comprise a step of scaling the virtual objects according to the real objects.

It is another object of the invention to provide a device for visualizing in real time a three-dimensional virtual object in a real environment, that device comprising means adapted for carrying out each step of the method described hereinabove.

It is still an object of the invention to provide a computer program comprising instructions adapted for carrying out each step of the method described hereinabove.

BRIEF DESCRIPTION OF THE DRAWINGS

Other advantages, objects and features of the present invention emerge from the following detailed description, given by way of nonlimiting example, with reference to the appended drawings, in which:

FIG. 3 is a flowchart of the method according to the present invention.

DETAILED DESCRIPTION

The method and the devices according to the invention enable mixing in real time of images of a digital model with real images of the environment of the product represented by that model in order to visualize that model in its real environment referred to as the showroom. The video stream produced comprises the video stream from sources such as video cameras filming the showroom to which the digital model is added. In the remainder of the description, that video stream is referred to as the augmented video stream, and the images of that stream are referred to as the augmented showroom.

A first part of the description illustrates the method and the devices according to the invention for visualizing a digital mock-up in a real environment. A second part indicates how that method and those devices are used to visualize virtual augmentations added to a real mock-up.

Figure 1:
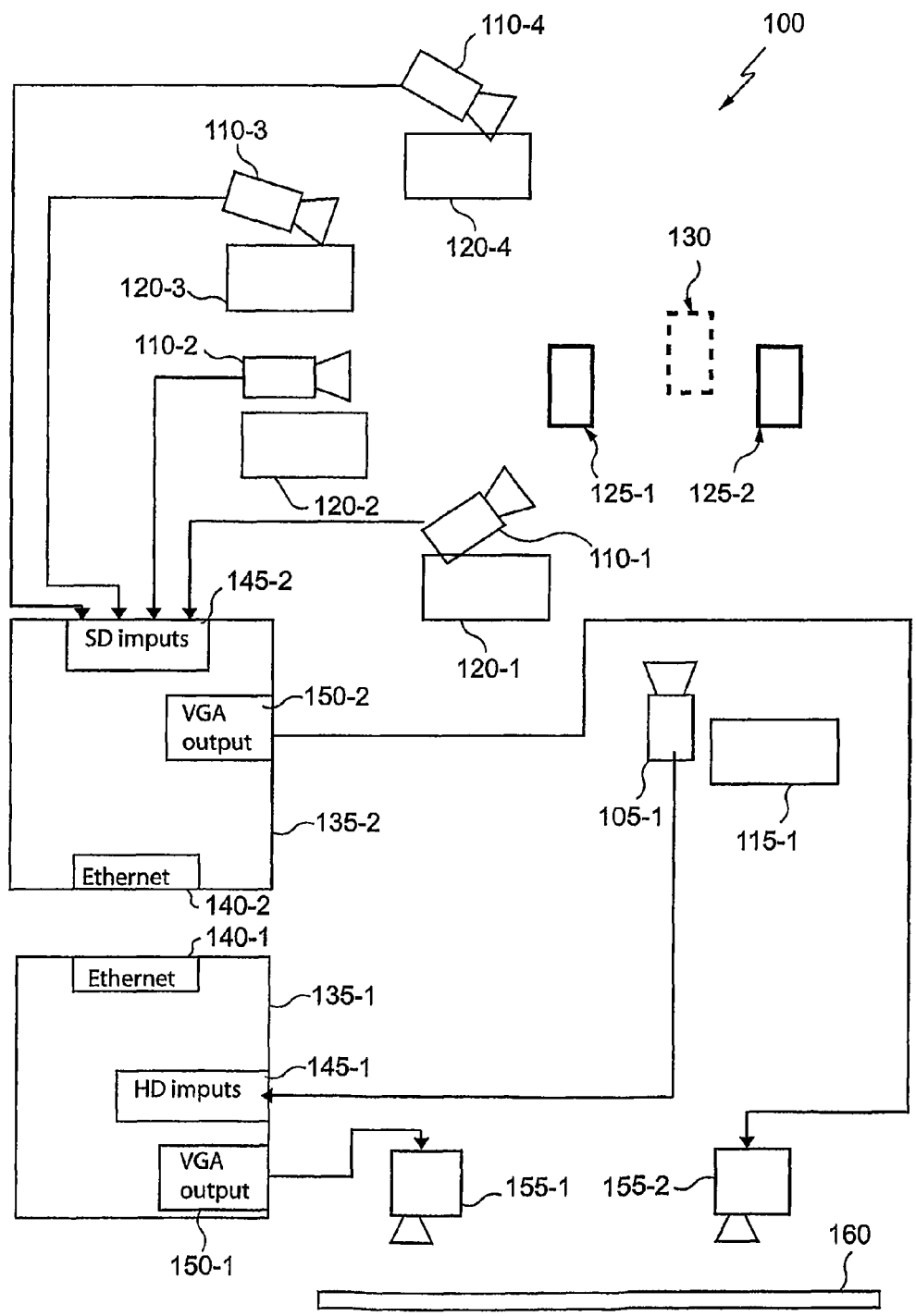
FIG. 1 is a diagrammatic illustration of the device of the present invention.

FIG. 1 illustrates diagrammatically one example of a device 100 according to the invention. In this example, the showroom is filmed by a high-definition video camera 105-1 and by four video cameras 110-1 to 110-4 having standard definitions. The high-definition camera can have one of the definitions specified by the HD standard, for example 1920 pixels by 1080 lines. The standard video cameras can be of PAL quality with acquisition in real time of 768 pixels by 576 lines. A movement capture device, or movement sensor, can be associated with each video camera. In this example, a movement sensor 115-1 is associated with the video camera 110-1 and the movement sensors 120-1 to 120-4 are associated with the video cameras 110-1 to 110-4, respectively.

Each movement sensor is attached to the video camera with which it is associated. The movement sensors are chosen according to the nature of the possible movements of the video cameras with which they are associated. For example, the movement sensors are of the azimuth/elevation/zoom type for video cameras having three degrees of freedom (horizontal rotation, vertical rotation and zoom) or of the x/y/z/pan/tilt/roll for video cameras having six degrees of freedom (displacement with respect to the x, y and z axes, horizontal rotation, vertical rotation and inclination).

The video cameras film the showroom, i.e. the space in which the digital mock-up is to be shown. The showroom can comprise real objects, for example the objects 125-1 and 125-2. The reference 130 represents the location of the digital mock-up.

The optical distortions and the field of view of the video cameras 105-1 and 110-1 to 110-4 are calculated before installation of the video cameras in the showroom.

The video cameras and the movement sensors are connected to a computer. The video cameras are preferably connected to a video acquisition card of the computer and the movement sensors are connected to a communication port of the computer. In the FIG. 1 example, the high-definition camera 105-1 and the movement sensor 115-1 are connected to a first computer 135-1, the cameras 110-1 to 110-4 and the movement sensors 120-1 to 120-4 are connected to a first computer 135-2. Here the computers are standard personal computers (PC).

Each personal computer 135-1 or 135-2 preferably has a respective Ethernet port 140-1 and 140-2, enabling the personal computers to exchange information with each other. Each personal computer also comprises a video acquisition card and a communication port (not shown). In this example, the personal computer 135-1 includes a high-definition acquisition card 145-1. At present, only one high-definition acquisition card can be inserted into a personal computer because of the bandwidth limitations imposed by the motherboard. In the future, a number of high-definition acquisition cards or one high-definition acquisition card and a number of standard acquisition cards could be used in the same personal computer, and thus a single personal computer could replace the personal computers 135-1 and 135-2. The personal computer 135-2 comprises four standard acquisition cards sharing the reference 145-2. The connection between the video cameras 110-1 to 110-4 and the acquisition cards 145-2 can be a composite video or SVideo connection. The high-definition or standard acquisition cards can be connected to the personal computers via the PCI bus.

Each of the personal computers 135-1 and 135-2 comprises a respective graphics card 150-1 and 150-2, for example a graphics card with 3D acceleration such as the ATI X800, ATI 1800XL, or NVidia 7900GTX cards, with a VGA type output, for example. The output of these graphics cards can be connected to a monitor (not shown) and/or to a video projector. In this example, the output of the graphics card 150-1 of the personal computer 135-1 is connected to the video projector 155-1 and the output of the graphics card 150-2 of the personal computer 135-2 is connected to the video projector 155-2. The video streams generated by the personal computers 135-1 and 135-2, or augmented video streams, can be shown simultaneously on one or more projection screens 160. Alternatively, a single augmented video stream can be shown. In the same way the four video streams generated by the personal computer 135-2 from the four video cameras 110-1 to 110-4 can be visualized simultaneously or not. The number of video streams and the visualization size are chosen by the user.

The principal role of the personal computers 135-1 and 135-2 is to acquire the video stream representing the showroom (FIG. 3, step 1), to add the digital mock-up to it in accordance with the position of the video cameras (FIG. 3, step 4) and to transmit the augmented video stream to a projector in real time (FIG. 3, step 5). To augment the video streams from the video cameras, the personal computers can use the D'FUSION software from the company TOTAL IMMERSION designed for applications in which reality is augmented by the insertion of 3D objects into video streams in real time.

The resolution of the images of the augmented video stream ideally correspond to the native resolution of the video projector used to display them. The resolution of the images of the augmented video stream can be modified to adapt it to the native resolution of the video projector used to display them by using the high-quality texture resizing technique available on the graphics card, such as bilinear filtering.

The digital mock-up is preferably produced using computer-assisted design (CAD) software or modeling software available off the shelf. The file is converted to the internal format of the D'FUSION software, for example the directX format. It is equally possible to import digital models of real objects that must be present in the augmented showroom in order to master problems of masking. The digital model can therefore be visualized in such a way that it is partially or totally masked by the real elements, as a function of the position of the video camera. At the time of rendering the scene, the digital model of the virtual object to be displayed in the real showroom and the digital models corresponding to the real objects present in the showroom (for example 125-1 and 125-2) are known. The digital models corresponding to the real objects are not visible in the image, but they make their contribution in relation to the depth (Z-buffer) information on the graphics card. Thanks to this contribution, the virtual object can be partially or totally masked by the real objects. The textured 3D model of the digital mock-up, animated if required, and the 3D models of the real objects present in the showroom are preferably stored, for example on the hard disk of the personal computers 135-1 and 135-2. The animations of the digital mock-up can be of the rotation, translation, change of scale and/or wire-mesh display type. The digital mock-up preferably has the native resolution of the video projector used to display the images of the augmented video stream.

When setting up the device, a real object is preferably installed at the location of the digital mock-up in the showroom. The size of that real object is preferably similar to that of the digital mock-up, by default, the proportions of this real object are similar to that of the digital mock-up for more accurate display of the virtual object in the real world. That real object has been modeled beforehand and the associated CAD file that represents it is used to calibrate the device. This real object can be a cube or a parallelepiped, for example, ideally produced from a material having a low coefficient of expansion. A location tool is used for each video camera to match characteristic points of the real object installed at the location of the digital mock-up with the corresponding points of the digital model of that real object. This enables the position and orientation (x/y/z/roll/pitch/nosedive) to be obtained in an absolute frame of reference linked to the real object. Thus all the video cameras are located in the same absolute frame of reference.

The D'FUSION software integrates the digital mock-up perfectly into the images from each video camera in real time. On start-up, the software can load a number of digital mock-ups. It is then possible to choose sequentially the display of one digital mock-up from those that have been loaded. For the selected digital mock-up, it is possible to change the material, e.g. the texture or the color, the position and/or the orientation. It is equally possible to show animations such as the opening of a door of a digital mock-up of a car, for example.

To manage reflections of the environment in the digital mock-up (FIG. 3, step 2), it is possible to produce a static environment texture. Two methods can be used:

- the showroom (walls, floors and ceilings) is modeled and the environment texture is then calculated using a standard modeler with video camera parameters at 180° (sphere or cube environment mapping); or
- a reflecting sphere is disposed in the showroom at the intended location of the digital mock-up and a photograph is taken. That photograph is used as a sphere environment map.

The static environment texture is determined during an initialization or installation phase. That texture is applied to the digital mock-up regardless of the events linked to the showroom. In particular a real object or a person present in the showroom moving will have no effect on the reflections generated on the digital mock-up.

To alleviate this problem, the method and the devices according to the invention are adapted to manage dynamically the reflections that are applied to the digital model (FIG. 3, step 2). A video camera is installed in the showroom at the location of the digital mock-up (130). This video camera is preferably fixed to the floor, pointing upward, i.e. to film upward. It is fitted with a fisheye lens. The video stream from this video camera is transmitted to the personal computers 135-1 and 135-2. It is used to update the environment texture in real time. For example, this enables one to see oneself reflected in the digital mock-up, and to see the reflections change on moving or if the content or the position of objects close to the digital mock-up changes.

Figure 2:
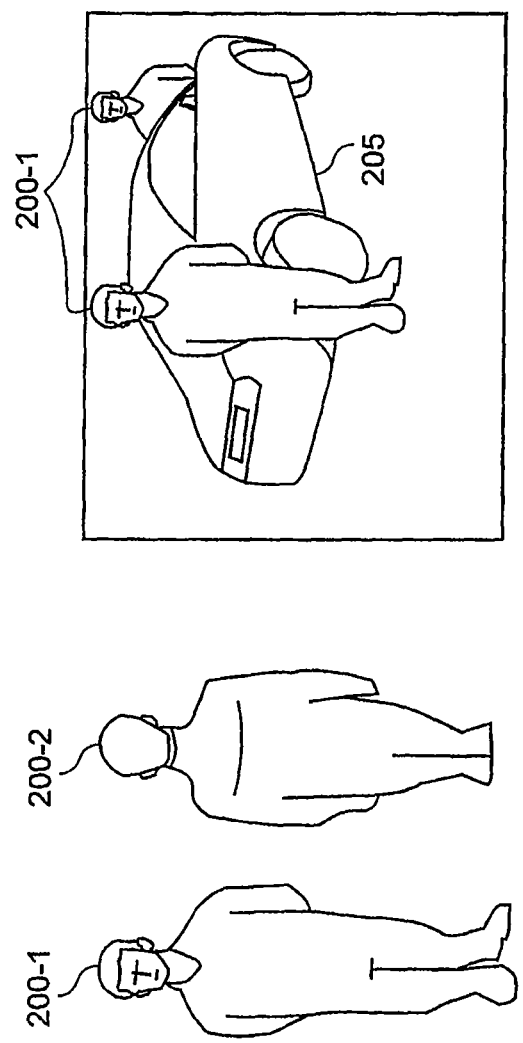
FIG. 2 shows the insertion of persons into the visualization of a digital model in a real environment.

It is possible to display persons in the augmented showroom on a one to one scale relative to the digital mock-up and thus relative to the real objects if the scale of the digital mock-up has been adapted to that of the real objects. The method for inserting persons into the augmented showroom consist in photographing the persons, preferably from in front and from behind, and clipping the persons from these photos. The photo can be clipped by modifying the photo to obtain an image of the person on a background of uniform color, for example a green background. When using this image, the D'FUSION software displays only the pixels that are not the color of the background, e.g. green, using the pixel shader function. Alternatively, the photograph of the person is sent to the D'FUSION software with another bitmap containing the alpha information, i.e. grayscale coded information enabling the graphics card used to decide, for each pixel, whether it should be shown or not. The photograph is used to texture a 3D object which can be a simple rectangle, for example. That 3D object is positioned in real time in the augmented showroom perpendicularly to the optical axis of the video camera producing the video stream used to generate the images of the augmented showroom, from in front or from behind according to the angle of the video camera. FIG. 2 illustrates this method. The references 200-1 and 200-2 show the result of clipping photos of a person taken from in front and from behind, respectively. The scene on the right shows the augmented showroom comprising the digital mock-up of a car 205 with the photo of the same person shown in front of (to the left) and behind (to the right) the digital mock-up of the car. The 3D object associated with the clipped photograph 200-1 is masked by the digital mock-up or masks the digital mock-up depending on its position.

During the visualization of the augmented showroom, it is possible to switch from the view from one video camera to another, for example using the keyboard of the personal computers 135-1 and 135-2. If the video cameras are mobile and motorized, it can also be possible to control their movement (FIG. 3, step 3), their orientation and/or their zoom factor, for example using the mouse, the keyboard or another pointing device such as a joystick connected to the personal computers 135-1 and 135-2. Virtual light sources can be added to the augmented showroom and can be adjusted in real time to harmonize them with the real lighting of the showroom. The 3D models of the real objects present in the showroom are used to mask the digital mock-up according to the position of those objects in the showroom.

The method and the devices according to the invention also use augmented reality to add virtual augmentations to a real mock-up and thus to increase the number of possible tests at the same time as reducing costs and delays. Referring to FIG. 1, the real objects 125-1 and 125-2 can represent two parts of a real mock-up to which the user wishes to add virtual augmentations. The virtual augmentations can naturally be positioned on or alongside one or more real objects without changing the nature of the method and the devices according to the invention.

The digital model of the real mock-up is preferably produced with the aid of CAD software or modelers available off the shelf and imported in the internal format of the D'FUSION software, for example the directX format. This 3D digital model is preferably stored on the hard disk of the personal computers used (the textures of this model are not necessary). The digital models of the virtual augmentations to be added to the real mock-up can also be produced with the aid of CAD software, imported in the internal format of the D'FUSION software and stored on a hard disk. The virtual augmentations are preferably at the native resolution of the video projector used to display the images from the augmented video stream, incorporating these virtual augmentations. As with the digital mock-ups described hereinabove, the virtual augmentations can be animated (rotation, translation, change of scale and/or wire-mesh display).

The exact position of the video cameras is determined by matching characteristic points of the real mock-up with the corresponding points of the digital model. Reflections are managed in the same way as for the visualization of the digital mock-ups.

When the virtual augmentations are displayed, it is possible to select each of them, to display them or to cause them to disappear, to change their position, to change their orientation and/or to change their texture.

The invention visualizes a digital mock-up in a real environment, or showroom, or visualizes virtual augmentations of a real mock-up. Apart from dynamic management of reflections generated by the showroom on the digital mock-up or the virtual augmentations, the innovations of the invention have the following advantages:
- dynamic management of the reflections of the external world on the digital mock-up or on the virtual augmentations can be combined with static management of those reflections by combining a number of environment maps (the degree of influence of each map can be given by a parameter varying between 0 and 1, for example);
- a number of video cameras can be used to visualize the digital mock-up or the virtual augmentations from different angles;
- the video cameras used to visualize the digital mock-up or the virtual augmentations in the showroom can be static or mobile, and their focal length can be variable;
- the augmented image, i.e. the image made up of real objects and virtual objects, is shown in real time, i.e. the visualization of the showroom comprising the digital mock-up or the virtual augmentations is simultaneous with the shooting of the showroom;
- the digital mock-up or the virtual augmentations can be animated in real time;
- the position of the digital mock-up or the virtual augmentations as well as their orientation in the showroom can be modified in real time;
- the showroom can comprise real objects, in particular real objects to be compared with the mock-up; as seen from each video camera, the digital mock-up or the virtual enrichments can be partially or totally masked by real objects;
- the position of the real objects in the showroom and their orientation can be modified in real time;
- the showroom can comprise physical persons;
- the device according to the invention can be connected to a videoconference system to transmit the composite images in real time to another site; and
- the device according to the invention can use high-definition cameras.

To satisfy particular requirements, a person skilled in the field of image processing and augmented reality can naturally modify the foregoing description to satisfy his requirements.

The invention claimed is:

1. A method for visualization in real time of a three-dimensional virtual object in a real environment, the method comprising:
- reception of at least one video stream comprising a representation of at least one real object different from the virtual object;
- insertion in real time of a two-dimensional representation of said three-dimensional virtual object into said at least one received video stream while masking a part of the virtual object by the at least one real object as a function of a three-dimensional model associated with the at least one real object and of a position of the at least one real object, and creation of at least one augmented video stream comprising said at least one received video stream into which said two-dimensional representation of said three-dimensional virtual object has been inserted;
- reception of a video stream of a second type, said at least one video stream being at least one video stream of first type, said video stream of a second type enabling to determine dynamically the reflections of said real environment in said three-dimensional virtual object;
- update of at least one dynamic environment with data from said video stream of the second type, said data representing changes in the reflections of said real environment on said virtual object, said changes resulting from modification of said real environment or movement of said virtual object;
- combination of said dynamic management of said reflections with a static management of said reflections by combining said at least one dynamic environment maps with at least one static environment map according to their respective degree of influence; and
- transmission of said at least one augmented video stream.

2. The method according to claim 1 wherein said video stream of a second type modifies the environment texture of said three-dimensional virtual object.

3. The method according to claim 1, wherein said virtual object is a digital mock-up.

4. The method according to claim 1 wherein said virtual object is a virtual augmentation of a real mock-up present in said real environment.

5. The method according to claim 1 further comprising a step of reception of at least one data stream associated with said at least one video stream of first type, said at least one data stream characterizing the movements of the source of the associated video stream, said two-dimensional representation of said three-dimensional virtual object being inserted in real time into said at least one received video stream in accordance with said at least one data stream.

6. The method according to claim 1 wherein said three-dimensional virtual object is animated.

7. The method according to claim 1 wherein the step of insertion in real time of a two-dimensional representation of said three-dimensional virtual object into said at least one received video stream further comprises the step of insertion in real time of a two-dimensional virtual object into said at least one received video stream.

8. The method according to claim 7 wherein said two-dimensional virtual object is a representation of a real person.

9. The method according to claim 1 wherein said real environment comprises at least one real object and in that this method further comprises the step of matching a plurality of feature points of said real object with the corresponding points of a virtual model of said real object.

10. The method according to claim 9 further comprising a step of locating the source of said at least one received video stream.

11. The method according to claim 9 further comprising a step of scaling said three-dimensional virtual object according to said at least one real object.

12. The method according to claim 1 wherein the degree of influence of each environment map is given by a parameter varying between 0 and 1.

13. The method according to claim 1 wherein the at least one video stream comprises a representation of at least one real object different from the virtual object and further comprising masking a part of the virtual object by the at least one real object as a function of a three-dimensional model associated with the at least one real object and of a position of the at least one real object.

14. A non-transitory computer readable storage medium embodied in a computer program product comprising computer readable instructions adapted for carrying out each step of a method for visualization in real time of a three-dimensional virtual object in a real environment, the method comprising:

reception of at least one video stream comprising a representation of at least one real object different from the virtual object;

insertion in real time of a two-dimensional representation of said three-dimensional virtual object into said at least one received video stream and creation of at least one augmented video stream comprising said at least one received video stream into which said two-dimensional representation of said three-dimensional virtual object has been inserted;

reception of a video stream of a second type, said at least one video stream being at least one video stream of first type, said video stream of a second type enabling to determine dynamically the reflections of said real environment in said three-dimensional virtual object;

update of at least one dynamic environment with from said video stream of the second type, said data representing changes in the reflections of said real environment on said virtual object, said changes resulting from modification of said real environment or movement of said virtual object;

combination of said dynamic management of said reflections with a static management of said reflections by combining said at least one dynamic environment maps with at least one static environment map according to their respective degree of influence; and transmission of said at least one augmented video stream.

\* \* \* \* \*